United States Patent [19]
Inoue

[11] Patent Number: 6,151,976
[45] Date of Patent: Nov. 28, 2000

[54] AXLE DRIVING APPARATUS

[75] Inventor: Toru Inoue, Amagasaki, Japan

[73] Assignee: Kanzaki Kokyukoki Mfg. Co., Ltd., Hyogo-Ken, Japan

[21] Appl. No.: 09/354,443

[22] Filed: Jul. 16, 1999

[30] Foreign Application Priority Data

Jul. 21, 1998 [JP] Japan .................................. 10-205422
Jul. 22, 1998 [JP] Japan .................................. 10-206187

[51] Int. Cl.$^7$ ............................. F16H 37/00; F16H 37/08
[52] U.S. Cl. ......................................... 74/15.66; 475/206
[58] Field of Search ............................. 74/15.66, 665 H, 74/665 G, 665 GA; 475/198, 200, 206

[56] References Cited

U.S. PATENT DOCUMENTS

| | | | |
|---|---|---|---|
| 2,203,282 | 6/1940 | Keese .................................. | 74/15.66 X |
| 3,555,930 | 1/1971 | Boyd ...................................... | 475/200 |
| 4,287,791 | 9/1981 | Numazawa et al. ..................... | 475/206 |
| 4,605,084 | 8/1986 | Haynes et al. .......................... | 180/70.1 |
| 4,817,753 | 4/1989 | Hiketa ..................................... | 475/206 X |
| 5,041,067 | 8/1991 | Hauser .................................... | 475/206 X |
| 5,188,574 | 2/1993 | Echigo et al. ........................... | 475/206 |
| 5,293,686 | 3/1994 | Martin et al. ........................... | 74/400 X |

FOREIGN PATENT DOCUMENTS

123847 3/1919 United Kingdom ................... 475/206

*Primary Examiner*—Sherry Estremsky
*Assistant Examiner*—Roger Pang
*Attorney, Agent, or Firm*—Sterne, Kessler, Goldstein & Fox, P.L.L.C.

[57] ABSTRACT

In an axle driving apparatus according to this invention, an input shaft is pivotally supported in a substantially horizontal fashion inside a housing, and projects outward on one side of the housing so as to receive power from a motor via a belt converter. Axles are pivotally supported in parallel to the input shaft inside the housing, and a speed-change mechanism is interposed between the input shaft and the axles. The speed-change mechanism is rotated in synchronism with the axles with a certain speed ratio thereto, is disposed above the axles, and includes at least one rotary shaft projecting outward on a side opposite to a side where the input shaft projects in the housing. A power take-off casing is disposed on the same side as the outer end of the rotary shaft in the housing and is adapted to accommodate the outer end of the rotary shaft therein. A power take-off shaft is pivotally supported in a substantially horizontal fashion in a direction perpendicular to the axles inside the power taking-out casing and is operatively interlocked with the rotary shaft.

5 Claims, 15 Drawing Sheets

AXLE DRIVING APPARATUS

BACKGROUND OF THE INVENTION

1. Field of the Invention

The present invention relates to an axle driving apparatus containing a transmission of a type used together with a belt converter in a vehicle such as a carrier or transporter, in which power can be taken out of the transmission for a vehicle of a four wheel drive type.

2. Related Art

There has been conventionally known a vehicle, such as a carrier or transporter in which an axle driving apparatus containing a gear type transmission is used together with a belt converter as a power transmission mechanism interposed between an engine and driving wheels. Namely, an input shaft for the gear type transmission projects in a lateral direction on one side of a housing of the axle driving apparatus, so that engine power is transmitted to the input shaft via the belt converter.

Such a vehicle is generally of a two wheel drive type, and therefore, has poor traction. If a four wheel drive type vehicle is constructed such that power is taken from the lower portion of the housing of the axle driving apparatus as usual, to be transmitted to other wheels (i.e., front wheels in the case where the axle of the axle driving apparatus is the drive shaft for the rear wheels), a power take-off portion forces the lower end of the housing of the axle driving apparatus to extend downwardly, thereby reducing the minimum road clearance of the vehicle. Furthermore, in a transmission for the axle driving apparatus, torque is inevitably lost during the power transmission from the input shaft toward the axle, so that since the torque is low when the power is taken out of the axle, e.g., the gear of the power transmission means must be enlarged by the quantity of the lost torque, thus hindering compactness or low cost.

SUMMARY OF THE INVENTION

An object of this invention is to improve a gear type transmission used together with a belt converter in order to transmit power in a vehicle; namely, to improve an axle driving apparatus comprising: a housing; a substantially horizontal input shaft which is pivotally supported inside the housing, which projects outward on one side of the housing, and receives power from a motor via a belt converter; axles pivotally supported in parallel to the input shaft inside the housing; and a speed-change mechanism interposed between the input shaft and the axles inside the housing; so as to take out power for a four wheel drive type vehicle at high torque while maintaining a minimum road clearance.

In order to achieve the above-described object, the speed-change mechanism includes at least one rotary shaft which is rotated in synchronism with the axles at a certain speed ratio. The rotary shaft is disposed above the axles, and projects outward on one side of the housing. On the same side as the rotary shaft in the housing, there is provided a power take-off casing for containing the outer end of the rotary shaft, and a power take-off shaft pivotally supported substantially horizontally, in a direction perpendicular to the axles and operatively interlocked with the rotary shaft. Since the power take-off casing is disposed to cover the outer end of the rotary shaft arranged prior to the axles, the power taking-out casing is positioned above the axles, thereby securely enlarging the minimum road clearance of the vehicle.

Brake devices are disposed on the axles. In some cases, the brake devices are disposed at the right and left sides of the housing. In the present invention, the above-said rotary shaft is disposed above the brake devices, so that the power take-off casing can be located high enough to securely enlarge the minimum road clearance without any interference with the brake devices.

Moreover, since the rotary shaft is positioned at the front stage beyond the axles in the power transmission system, a torque loss of the rotary shaft is smaller than that of the axle; namely, high torque can be ensured, so that a compact operatively-interlocked mechanism for driving the power take-off shaft is sufficiently obtained at a low cost. For example, the power is transmitted from the rotary shaft to the power take-off shaft while the direction is changed, via a pair of bevel gears in mesh with each other, located inside the power take-off casing. Otherwise, a counter shaft is pivotally supported in parallel to the power take-off shaft, nearer to the housing than to the power take-off shaft inside the power take-off casing. The pair of bevel gears in mesh with each other are interposed between the rotary shaft and the counter shaft, and a pair of gears in mesh with each other are interposed between the counter shaft and the power take-off shaft.

Additionally, the power take-off casing projects outwardly on a side opposite to the input shaft in the housing. If the power take-off casing is disposed outside of the housing so as to cover the outer end, the axle driving apparatus can be provided without any lateral deviation since the power take-off casing is disposed by utilizing an effective space on a side opposite to the input shaft (to which a driven pulley and the like are attached). Moreover, if the input shaft and the power take-off casing are provided on the same side, it is necessary to enlarge the housing vertically or laterally so as to offset both the input shaft and the power take-off casing without any mutual interference. However, having the input shaft and the power taking out casing disposed opposite to each other eliminates such necessity, so as to make the entire axle driving apparatus compact.

DETAILED DESCRIPTION OF THE PREFERRED EMBODIMENTS

Figure 1:
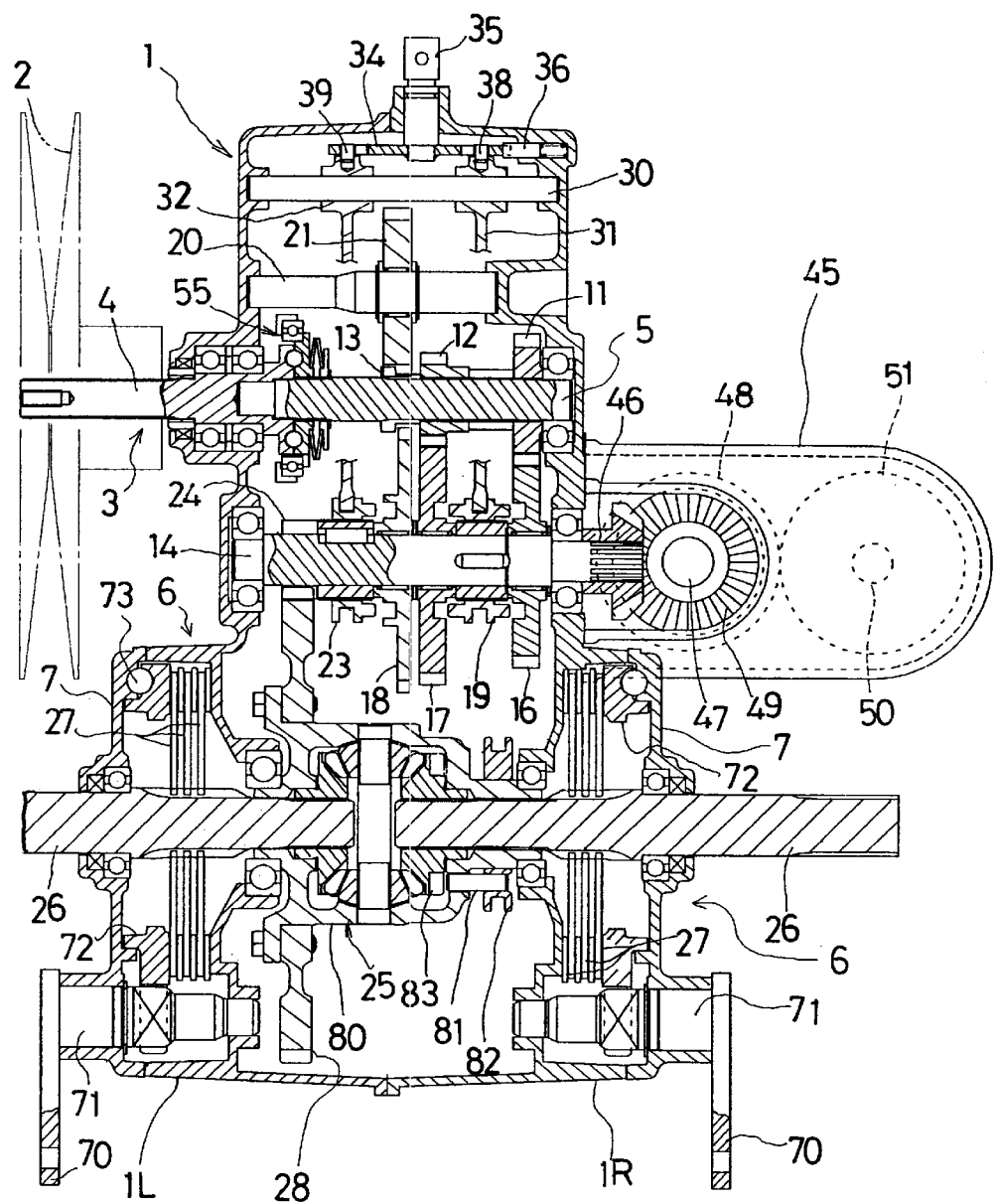
FIG. 1 is a rear cross-sectional view showing an axle driving apparatus according to this invention.

First, the structure of an axle driving apparatus according to this invention will be explained with reference to FIGS. 1 and 2. A housing 1 is divided into a right half case 1R and a left half case 1L, as viewed in FIG. 1. A speed-change mechanism and the like are accommodated inside the housing 1 consisting of the right and left halves 1R and 1L in abutment with each other, thus constituting the axle driving apparatus.

An input shaft 3 extending in a lateral direction is pivotally supported approximately midway along the height of the housing 1. One side (the left in this embodiment) of the input shaft 3 projects outward of the left surface of the case 1L. An input pulley 2, serving as a split pulley, is fitted around the end of the input shaft 3.

Inside the housing 1, the input shaft 3, a speed-change shaft 14, an idle shaft 20, a shifter shaft 30, and a pair of coaxial axles 26, 26 are disposed in parallel to each other in a substantially horizontal direction. The idle shaft 20 and the shifter shaft 30 are engageably fixed onto the right and left side walls of the housing 1. The input shaft 3, the speed-change shaft 14 and the axles 26 are rotatably supported on the right and left side walls of the housing 1.

As described above, the input shaft 3 projects outwardly of the inside of the housing 1, and consists of a first input shaft 4 provided with the input pulley 2, and a second input shaft 5 pivotally supported inside the housing 1 in a manner coaxial with the first input shaft 4. That is, inside the housing 1, the first input shaft 4 is rotatably supported on one side wall (on the left wall in FIG. 1) of the housing 1, one end of the second input shaft 5 is rotatably supported on the other side wall (on the right wall) of the housing 1 while the other end of the second input shaft 5 is rotatably fitted into the inner end of the first input shaft 4. Furthermore, a torque-operation type coupling 55, connected to a throttle valve for an engine serving as a motor, is interposed between the first input shaft 4 and the second input shaft 5, and is configured such that the engine speed is increased as a load is applied from the sides of the wheels of a vehicle. The structure of the coupling 55 will be described in more detail below.

Figure 2:
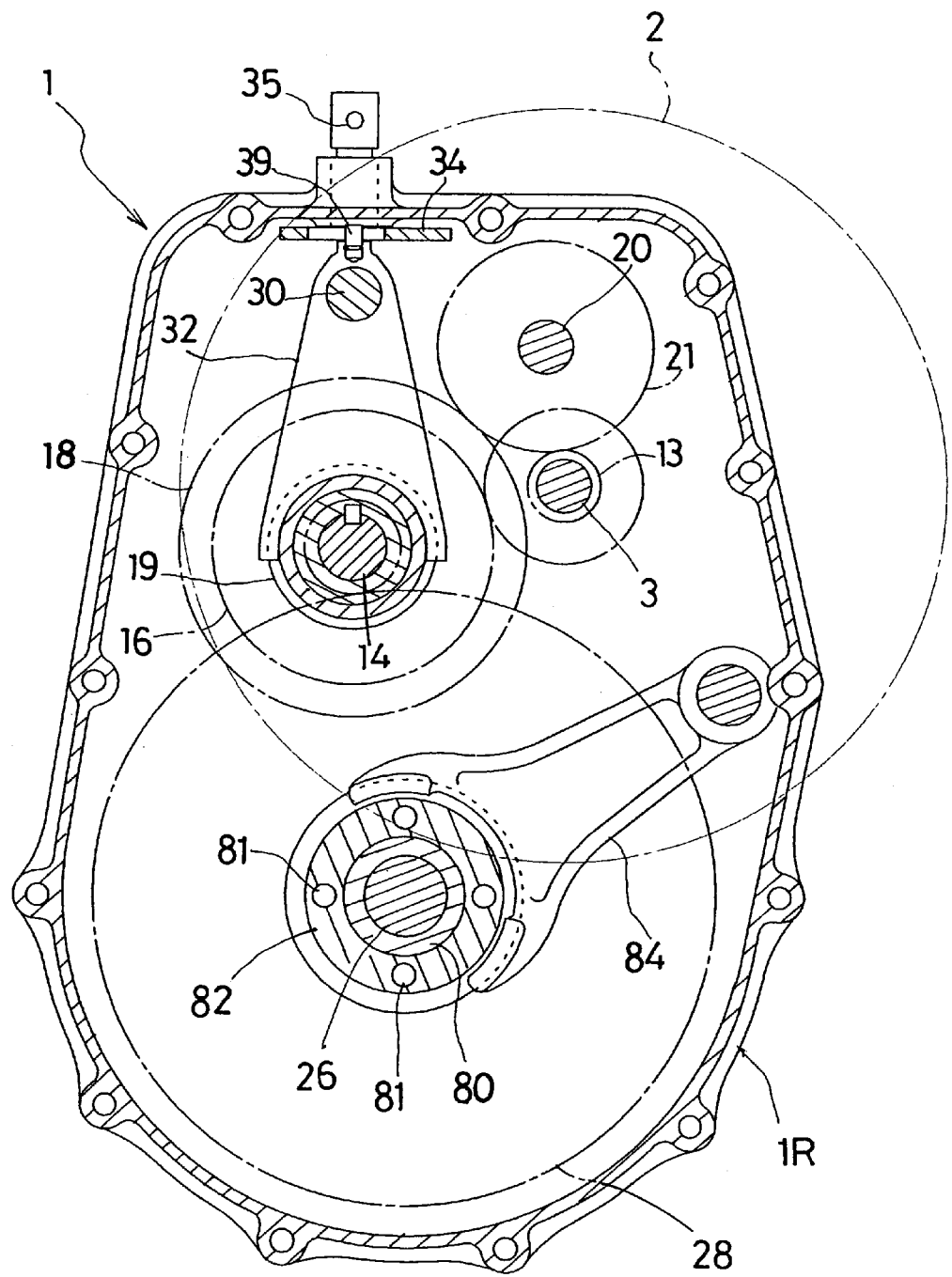
FIG. 2 is a side cross-sectional view showing the axle driving apparatus of FIG. 1 according to this invention.

On the second input shaft 5, a high-speed gear 11, a low-speed gear 12 and a rearward gear 13 are fixed in such order from the right as viewed in FIG. 1. Likewise, on the speed-change shaft 14, a high-speed driven gear 16, a low-speed driven gear 17 and a rearward driven gear 18 are pivotally supported rotatably in such order from the right as viewed in FIG. 1. The high-speed driven gear 16 and the high-speed gear 11 are in mesh with each other all the time, and further, the low-speed driven gear 17 and the low-speed gear 12 are in mesh with each other all the time.

Figure 3:
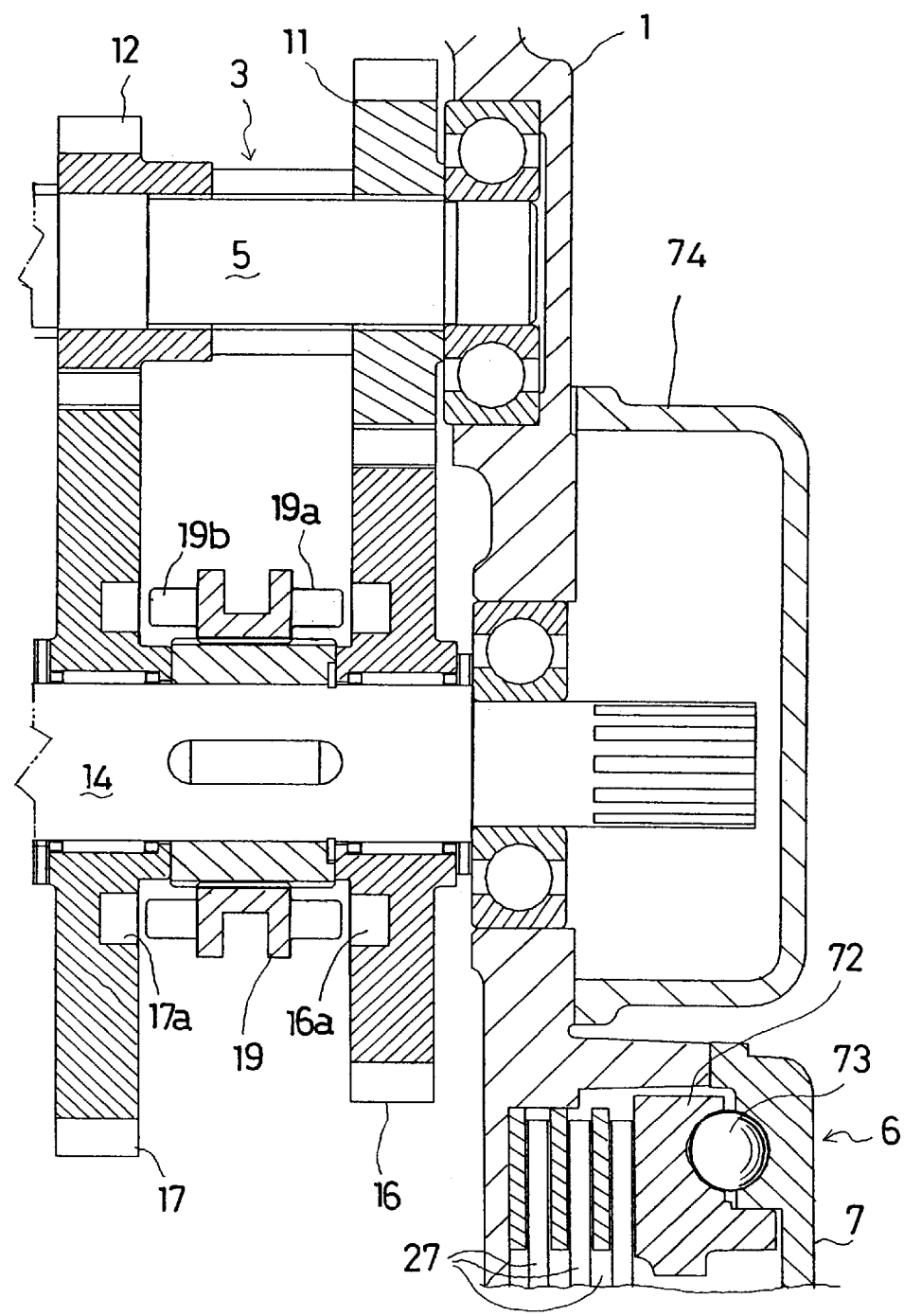
FIG. 3 is a rear cross-sectional view showing a part of a speed-change mechanism inside the axle driving apparatus of FIG. 1.

A forward speed-change slider 19 is interposed between the high-speed driven gear 16 and the low-speed driven gear 17 on the speed-change shaft 14 via a spline hub in such a manner that slider 19 is not relatively rotatable and slidable in an axial direction. FIG. 3 shows the slider 19 in a neutral position. When the slider 19 is slidably operated to the right from the neutral position, as viewed in FIG. 3, a projection 19a formed at the right surface of the slider 19 is fitted into a recess 16a formed at the left surface of the high speed driven gear 16, so that the speed-change shaft 14 is rotated forward at a high speed. To the contrary, when the slider 19 is slidably operated to the left from the neutral position, as viewed in FIG. 3, another projection 19b formed at the left surface of the slider 19 is fitted into a recess 17a formed at the right surface of the low-speed driven gear 17, so that the speed-change shaft 14 is rotated forward at a low speed.

An idle gear 21 is rotatably fitted around the idle shaft 20, to be in mesh with the rearward gear 13 and the rearward driven gear 18. The rearward gear 13 and the rearward driven gear 18 are deviated from each other in the lateral direction, so that the lateral width of the idle gear 21 is made greater than those of the gears 13 and 18. The gears 13 and 18 in mesh with the idle gear 21 partly overlap with each other (i.e., at the respective outer ends of the gears 13 and 18), as viewed sideways in FIG. 3. This contributes to compactness of the gear train in the input shaft 3 (the second input shaft 5), the idle shaft 20 and the speed-change shaft 14.

A recess is formed also at the side surface of the rearward driven gear 18. A rearward slider 23 is disposed on the speed-change shaft 14 via another spline hub on the left of the rearward driven gear 18 in such a manner that rearward slider 23 is not relatively rotatable and slidable in the axial direction. A projection is formed at the side surface of the slider 23 in such a manner as to face the recess formed at the side surface of the rearward driven gear 18. The slider 23 is slid from the neutral position, as shown in FIG. 1, rightward, and then, the projection is fitted into the recess of the rearward driven gear 18. Consequently, engine power is transmitted to the speed-change shaft 14 via the input shaft 3, the rearward gear 13, the idle gear 21 and the rearward driven gear 18, and thus, the speed-change shaft 14 is rotated rearwardly (reversely).

Moreover, a gear 24 is fixed on the speed-change shaft 14, leftward of the slider 23 as shown in FIG. 1. A ring gear 28 secured to the outer peripheral surface of a differential casing 80 constituting a differential arrangement 25, is in mesh with the gear 24. The power of the speed-change shaft 14 is transmitted to the axles 26, 26 via the differential arrangement 25. Therefore, ignoring of the differential connection between both of the axles 26, the speed-change shaft 14 and the axles 26 are rotated substantially in synchronism with each other, or they are rotated with a certain speed ratio therebetween. As shown in FIG. 2, the speed-change shaft 14 is disposed above the axles 26.

A differential lock slider 82 is axially slidably fitted onto a boss formed on a side of the differential casing 80, which is laterally opposite to the ring gear 28, for allowing one axle 26 (the right axle 26 in FIG. 1) to pass there through. A lock pin 81 projecting in parallel to the sliding direction of the slider 82 is fixed to the slider 82. The lock pin 81 is slidably inserted into the side surface of the differential casing 80 facing the slider 82. Inside the differential casing 80, a recess facing the lock pin 81 is formed in a differential gear 83 secured onto the inner end of the axle 26 on a side where the slider 82 is disposed.

An annular groove is formed around the slider 82. A differential shift fork 84, shown in FIG. 2, operatively interlocked with a differential lock operating tool, such as a differential lock lever 66, described later, is fitted into the annular groove. When an operator operates the differential lock operating tool, the slider 82 is interlocked with the differential lock operating tool via the fork 84 to thus slide it leftward from the position shown in FIG. 1, whereby the end of the lock pin 81 is inserted into the recess formed at the right differential gear 83. Consequently, the differential casing 80 is integrated with the right axle 2G, so that the differential arrangement 25 is locked, and thus, the right and left axles 26, 26 are driven at the same rotational speed without any relative difference.

Figure 8:
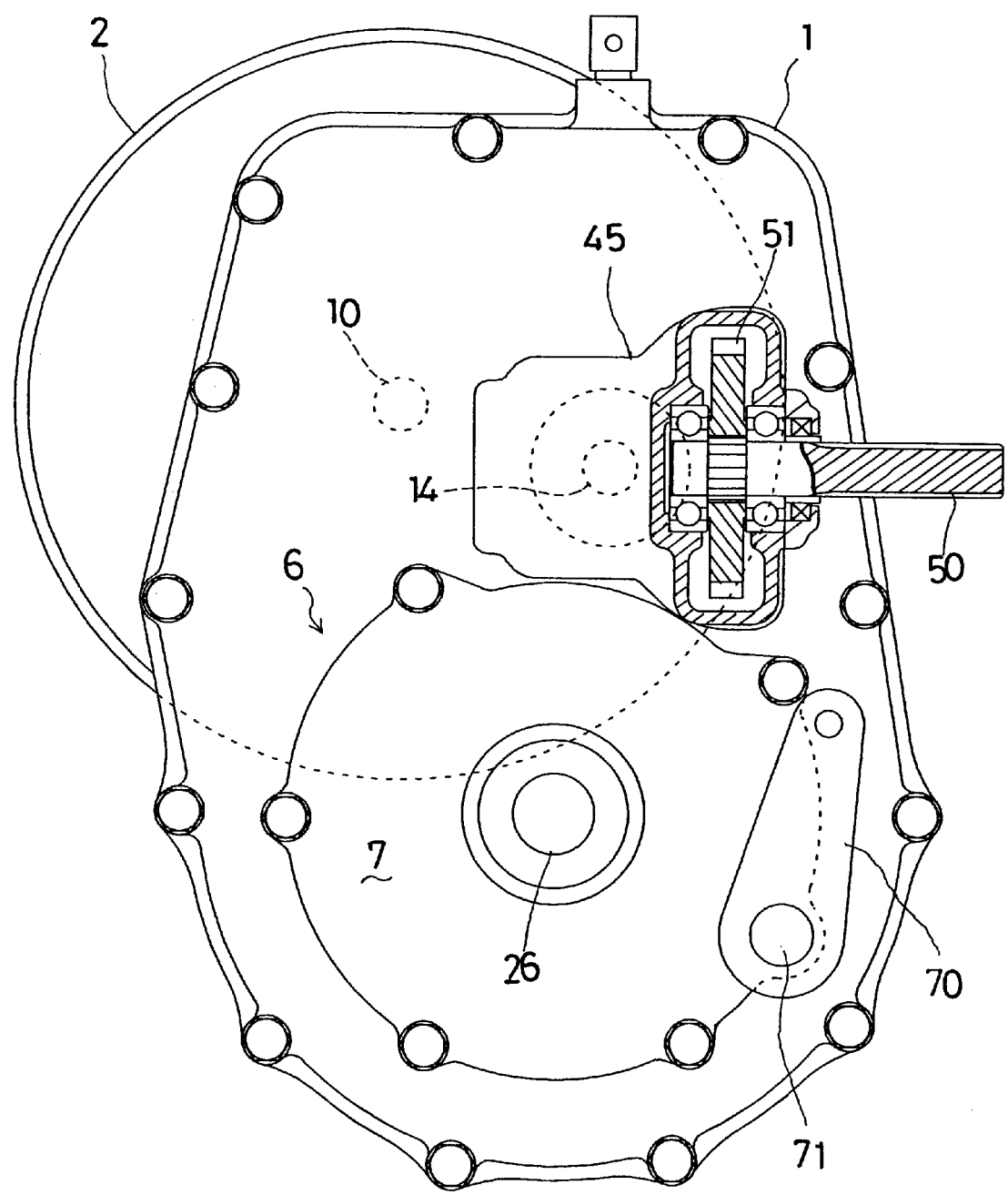
FIG. 8 is a side view, partly in section, showing a power take-off casing fixed to the housing of the axle driving apparatus of FIG. 1.

As shown in FIGS. 1 and 8, two multi-disc brakes 6,6 or brake devices are disposed on the axles 26, 26, respectively. That is, a plurality of discs 27 are spline-engaged with the axle 26, and a brake pad is interposed between each of the adjacent discs 27. Outside of the outermost discs 27,27, brake covers 7 are fixed at an opening edge around each of the axles 26 at the right and left of the housing 1, and then, the axle 26 is supported at the center of each brake cover 7. At each side a piston 72 is arranged between the inside surface of the brake cover 7 and the outermost disc 27. Furthermore, a cam 73 is interposed between the inside surface of the brake cover 7 and the piston 72. A strut 71 is rotatably supported between each of the right and left walls of the housing 1 and the side wall of each of the brake covers 7, 7. Each of the pistons 72 engages with the intermediate portion of each of the struts 71. A brake arm 70 fixed at the outer end of each of the struts 71 outside of the housing 1 is operatively interlocked with a brake operating tool such as a brake pedal 68, described later.

When the operator operates the brake operating tool (namely, the brake pedal 68), the arm 70 is pulled in interlock with the braking operation, so that the strut 71 is rotated. Consequently, the piston 72 is rotated, and further, is moved toward the disc 27 beyond the cam 73, thereby pressing and braking the disc 27, so as to brake the axle 26.

Next, explanation will be made of a mechanism relating to the slide operation of both the sliders 19 and 23. At the upper portion inside the housing 1, the shifter shaft 30 is disposed in parallel to the input shaft 3, as shown in FIG. 1. Bosses of two shift forks 31 and 32 are slidably fitted around the shifter shaft 30, approximately midway in the lateral direction. A fork claw of the forward shift fork 31, shown on the right in FIG. 1, is fitted into an annular groove formed in the forward speed-change slider 19; meanwhile, a fork claw of the rearward shift fork 32, shown on the left in FIG. 1, is fitted into an annular groove formed in the rearward slider 23. Pins 38 and 39 are immovably fitted at the upper surfaces of the bosses of the forks 31 and 32. The pins 38 and 39 are inserted into the grooves formed at an operating plate 34, described later, disposed at the upper portion inside the housing 1.

As shown in FIGS. 4 to 7, the operating plate 34 is a substantially square plate as viewed from above. At the center of the operating plate 34 is fixed the lower end of a vertical operating shaft 35 operatively interlocked with a speed-change operating tool such as an auxiliary speed-change lever 67, described later. The intermediate portion of the operating shaft 35 in the vertical direction is pivotally supported at the upper surface of the housing 1. Detent engaging recesses 34a, 34b, 34c and 34d are formed at one end (the right end as shown in FIGS. 4 to 7) of the operating plate 34.

On the other hand, an insertion hole 1a is bored in the right inner wall of the housing 1 at a position opposite to the recesses 34a, 34b, 34c and 34d formed in the operating plate 34. A spring 37 and a flat abutting plate 36 are slidably inserted into the insertion hole 1a. The head of the abutting plate 36 is fitted into any one of the recesses 34a, 34b, 34c and 34d by the urging force of the spring 37, thus constituting a detent mechanism for urging and holding the operating plate 34.

A forward guide groove 40 and a rearward guide groove 41 are formed at the right and left of the operating plate 34, respectively, as shown in FIGS. 4 to 7. The pin 38 and the pin 39 are slidably fitted into the groove 40 and the groove 41, respectively.

The forward guide groove 40 is formed into a substantially N shape as viewed from above. A groove 40a, which is a portion of the groove 40, is formed into an arcuate shape on the operating shaft 35, thereby holding the forward speed-change slider 19 at the neutral position. A linearly bending portion 40b is adapted to hold the slider 19 at the forward low-speed position. A linear end 40c of the groove 40 is adapted to hold the slider 19 at the forward high-speed position.

Additionally, the rearward guide groove 41 is formed into a substantially V shape as viewed from above. A groove 41a, which is a portion of the groove 41, is formed into an arcuate shape on the operating shaft 35, thereby holding the rearward slider 23 at the neutral position. The residual portion of the groove 41 is formed linearly. An end 41b is adapted to hold the rearward slider 23 at the rearward position.

Figure 4:
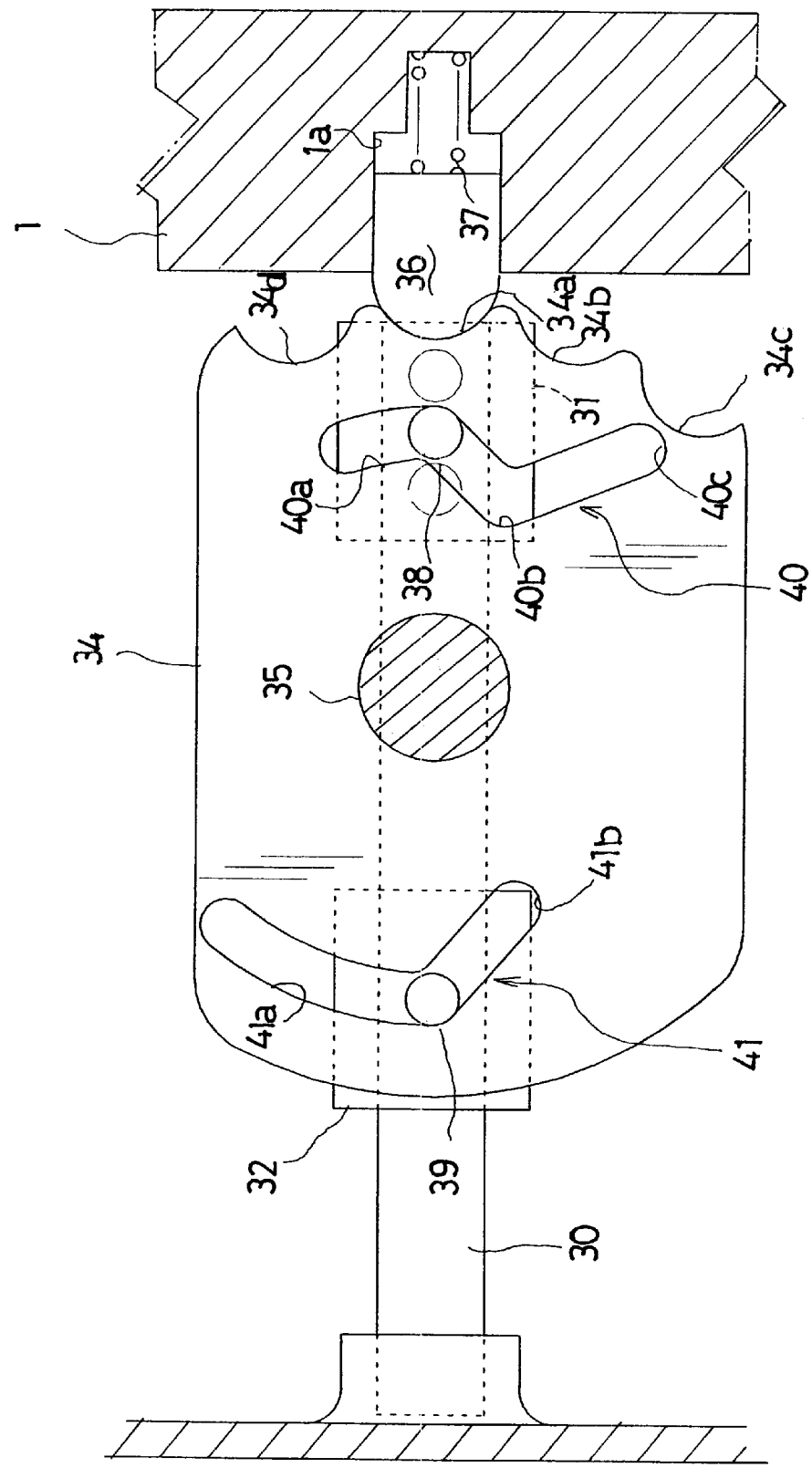
FIG. 4 is a plan view of an operating plate located in a neutral position.

Consequently, as shown in FIG. 4, the pin 38 is fitted into the groove 40a at the neutral position where the abutting plate 36 is fitted into the second recess 34a from the front, and the slider 19 is located at the neutral position via the forward shift fork 31. At this time, the pin 39 is fitted into the groove 41a at the neutral position, so that the rearward slider 23 is located at the neutral position via the rearward shift fork 32, thus preventing a vehicle from running neither forward nor rearward.

Figure 5:
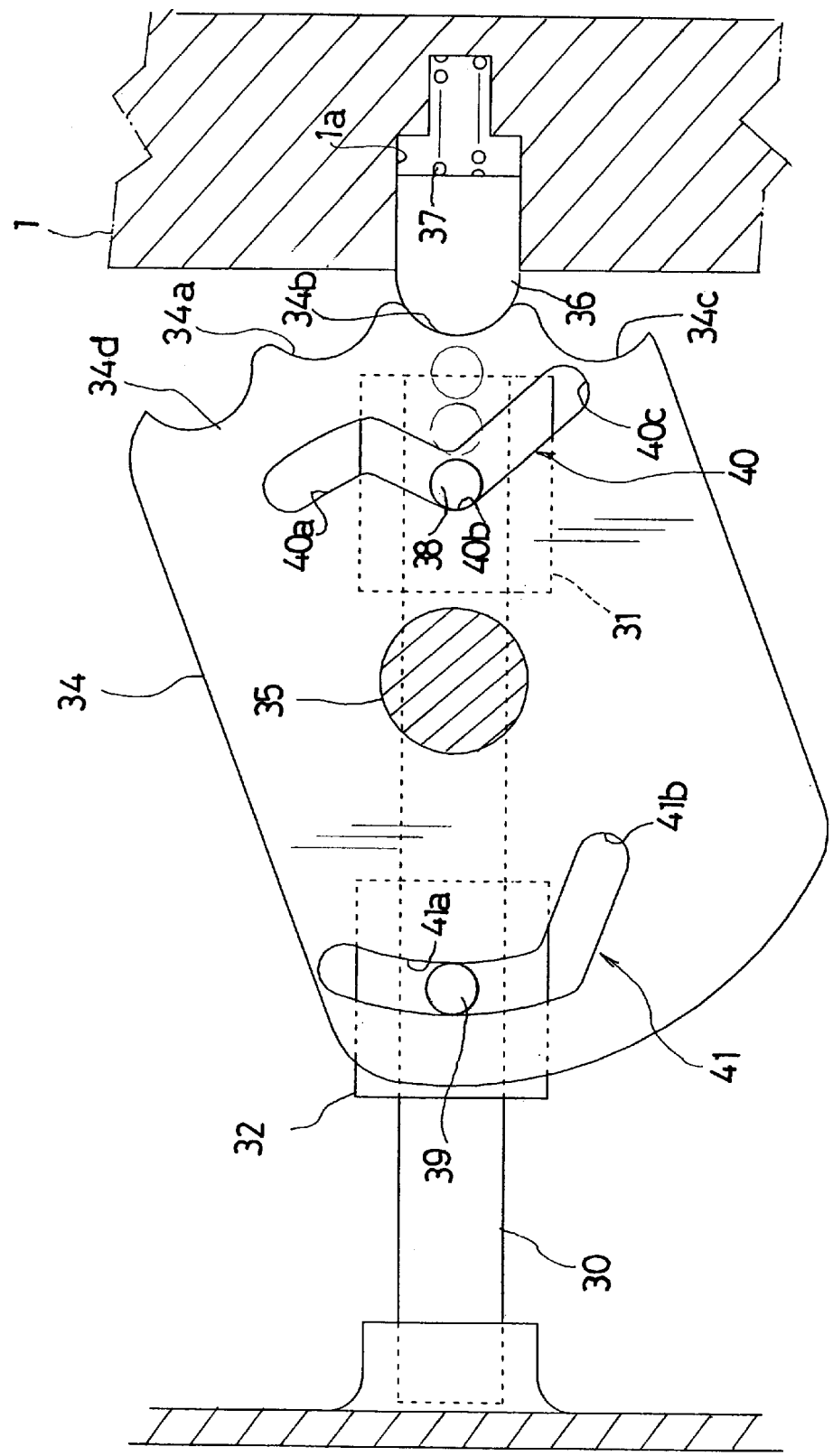
FIG. 5 is a plan view of the operating plate of FIG. 4 located in a forward low-speed position.
Figure 6:
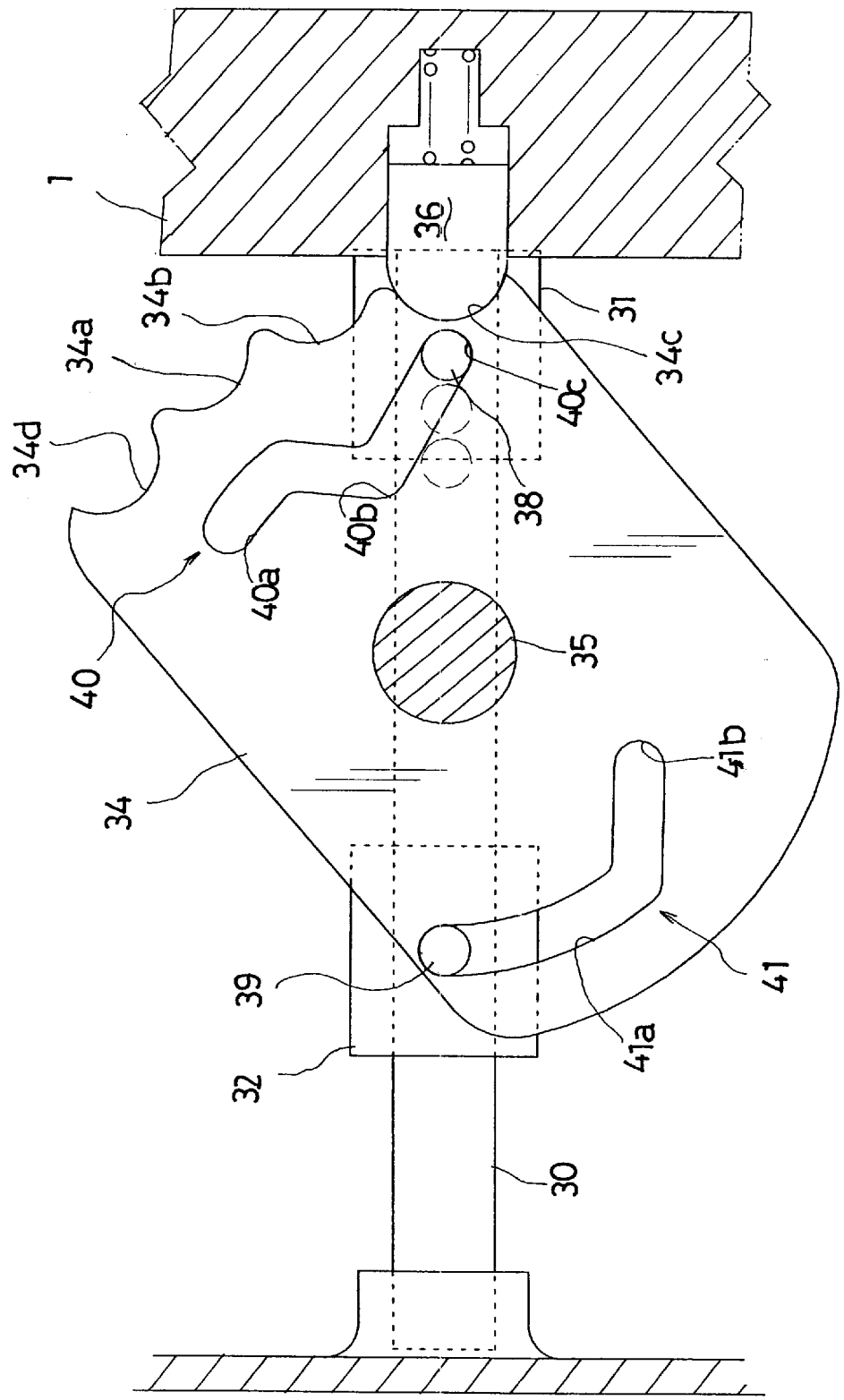
FIG. 6 is a plan view of the operating plate of FIG. 4 located in a forward high-speed position.

When the operating plate 34 is turned counterclockwise, as viewed from the top as shown in FIG. 4, via the operating shaft 35 from the position shown in FIG. 4, the pin 38 reaches the bending portion 40b at the forward low-speed position while the pin 38 is moved toward a direction (leftward) near the operating shaft 35, following to the shape of the forward guide groove 40 as shown in FIG. 5, so that the abutting plate 36 is fitted into the recess 34b. Together with this movement of the pin 38, the fork 31 is moved leftward, and then, the slider 19 engages with the low-speed driven gear 17, so that the power, which is changed to a low speed, is transmitted to the speed-change shaft 14, thus allowing the vehicle to run forward at a low speed. At this time, the pin 39 is located midway within the rearward neutral position of the groove 41a, and the slider 23 is held at the neutral position. The position of the operating plate 34 at this moment is defined as the forward low-speed position.

When the operating plate 34 is turned further counterclockwise, the pin 38 reaches the end 40c of the groove at the forward high-speed position while being guided toward a direction separated from the operating shaft 35 (rightward as viewed in FIG. 6), so that the abutting plate 36 is fitted into the recess 34c. At the same time, the fork 31 fixed to the pin 38 is moved rightward, and then, the slider 19 is engaged with the high-speed driven gear 16. Consequently, the speed-change shaft 14 is rotated forward at a high speed, thereby allowing the vehicle to run forward at a high speed. In this position, the pin 39 is located at the front end inside the groove 41a within the rearward neutral holding range, and the slider 23 is maintained at the neutral position. The position of the operating plate 34 at this moment is defined as the forward high-speed position.

Figure 7:
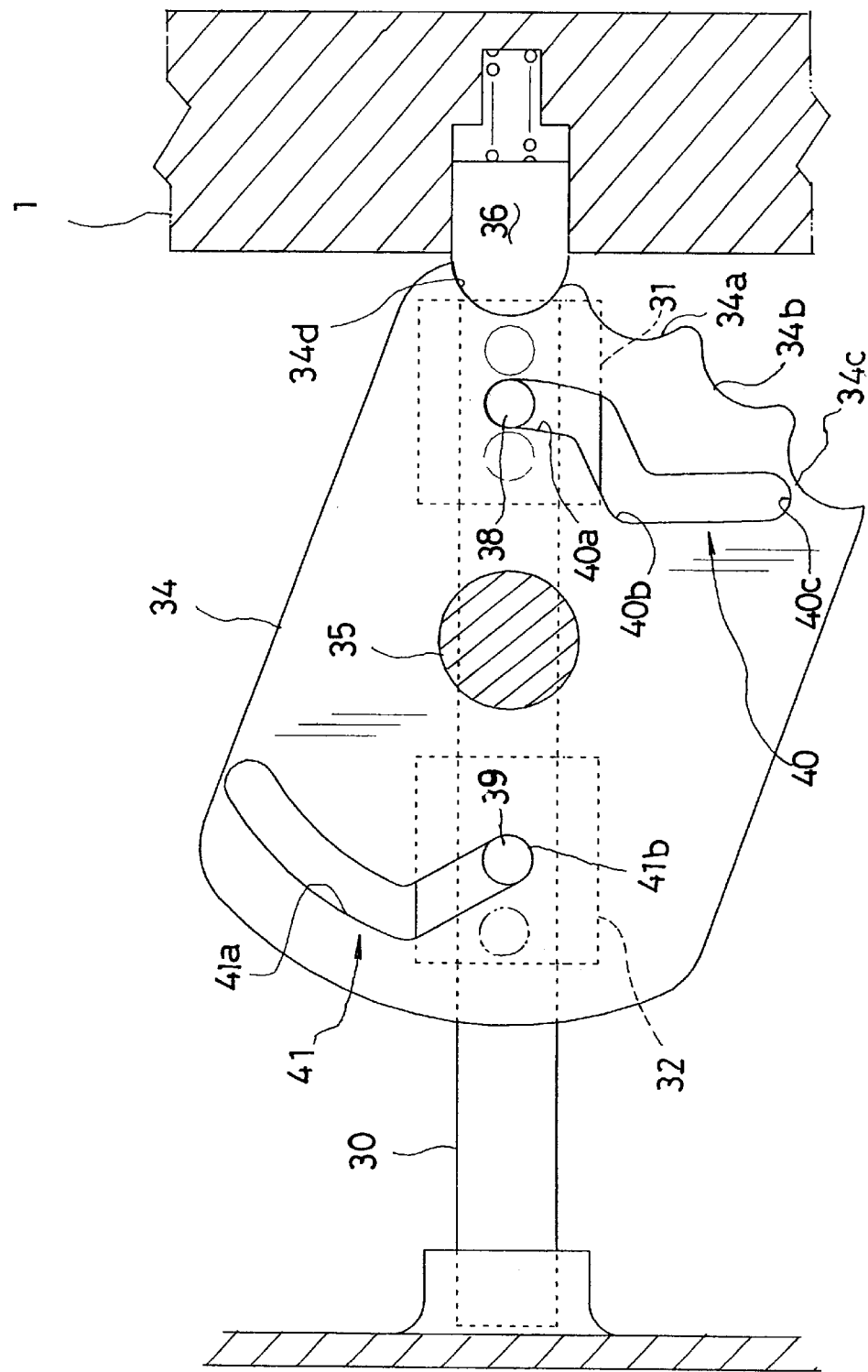
FIG. 7 is a plan view of the operating plate of FIG. 4 located in a rearward drive position.

Additionally, when the operating plate 34 is turned clockwise from the position shown in FIG. 4, the pin 39 is moved toward a direction (rightward) near the operating shaft 35 and reaches the groove 41a while being guided by the rearward guide groove 41, as shown in FIG. 7, and the abutting plate 36 is fitted into the recess 34d. At this time, the pin 38 reaches the front end of the groove 40a within the forward neutral holding range in a neutrally maintained state. The slider 23 is moved rightward via the fork 32, so that the rearward driven gear 18 is engaged and the speed-change shaft 14 is rotated rearward, as shown in FIG. 7, thereby allowing the vehicle to travel rearward. The position of the operating plate 34 at this moment is defined as the rearward drive position.

In this way, the use of the single plate 34 enables both the shift forks 31 and 32 to be operated, can make it unnecessary to dispose operating shafts, operating rods and the like in two systems for forward and rearward running, respectively, and can simplify the inside configuration of the housing 1 and the linkage to the speed-change operating tool.

Next, an explanation will be made of the arrangement (a power take-off mechanism) for taking out power for a purpose other than for driving the axles 26 by the transmission inside the housing 1.

Figure 9:
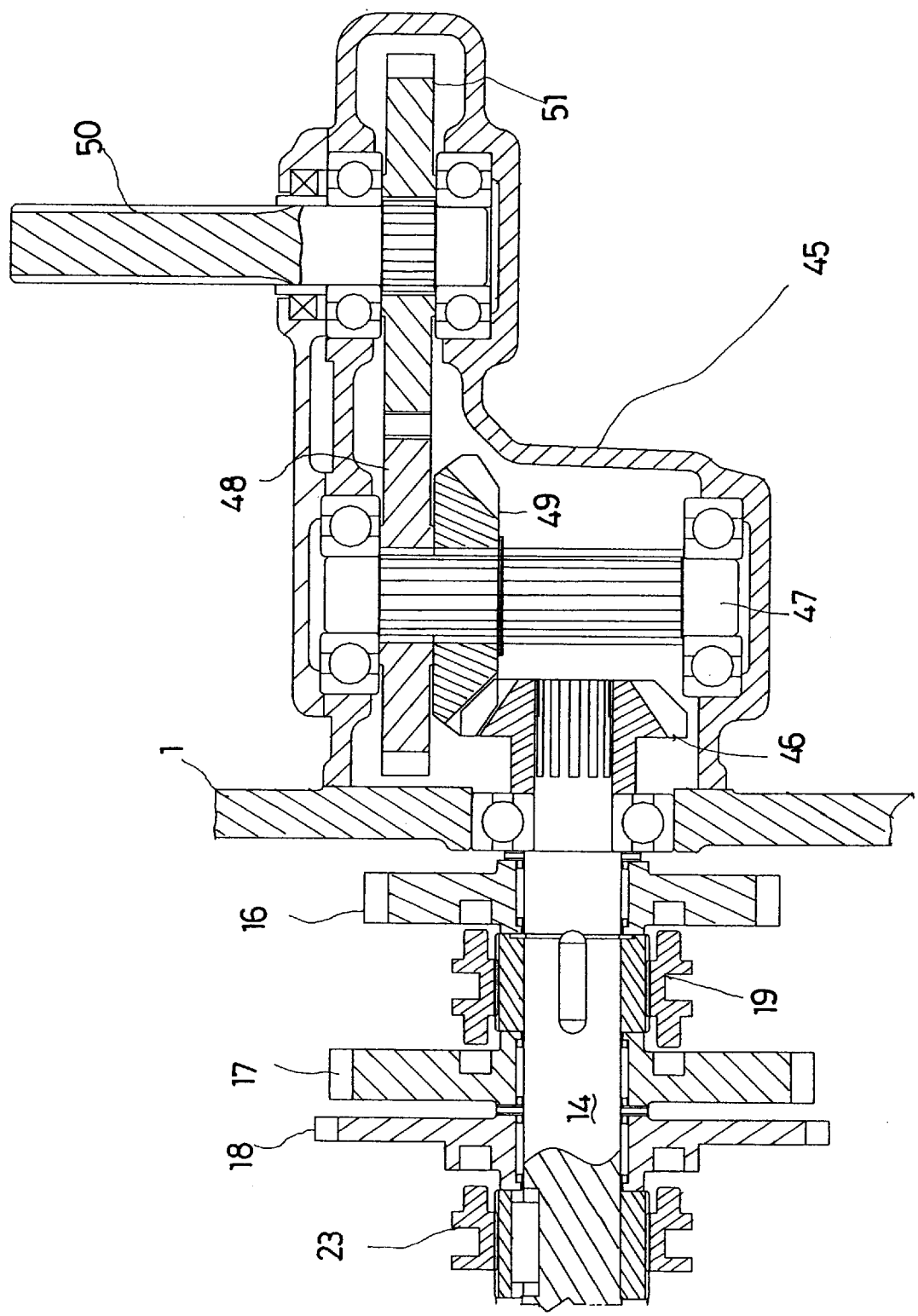
FIG. 9 is a plan cross-sectional view of the power take-off casing of FIG. 8.

As shown in FIGS. 8 and 9, the speed-change shaft 14 projects outward of one side surface of the housing 1, to be intruded into a power take-off casing 45 fixed at the outside surface of the housing 1. A bevel gear 49 is attached to the outer end of the speed-change shaft 14. Inside the power take-off casing 45, a counter shaft 47 is rotatably supported in a horizontal direction perpendicular to the axle 26. The bevel gear 49 disposed on the counter shaft 47 is in mesh with another bevel gear 46. A power take-off shaft 50 is rotatably supported inside the power take-off casing 45 in parallel to the counter shaft 47 (i.e., in a horizontal direction perpendicular to the axle 26), and projects outward. Inside the power take-off casing 45, a counter gear 48 disposed on the counter shaft 47 is in mesh with a transmission gear 51 disposed on the power take-off shaft 50.

In this way, the power take-off mechanism for rotating and driving the power taking-out shaft 50 in synchronism with the rotation of the speed-change shaft 14 is located at the side surface of the housing 1. As described above, since the speed-change shaft 14 is rotated substantially in synchronism with the axle 26, the power take-off shaft 50 is substantially synchronized with the axle 26 at a certain speed ratio. Therefore, an object to be driven by the power take-off shaft 50 can be driven in synchronism with the axle 26. The power take-off shaft 50 is featured in the rotation in synchronism with the axle 26. For example, when the embodiment shown in FIGS. 8 and 9 is applied to interpose a rotary shaft, such as a counter shaft, a speed-reduction shaft or an auxiliary speed-change shaft, rotated in synchronism with the axle 26, and parallel to the axle 26 inside the housing 1 between the speed-change shaft 14 and the axle 26, such a rotary shaft may project outward of the housing 1 in place of the speed-change shaft 14 to be power-coupled to the power take-off shaft 50.

With respect to the disposing position of the power take-off casing 45, as shown in FIG. 8, the power take-off casing 45 is positioned above the brake cover 7 in consideration of the arrangement of the speed-change shaft 14 above the axle 26 and the brake cover 7, so that the power take-off casing 45 and the brake cover 7 are offset from each other in the vertical direction without any interference with each other. At the same time, the lower end of the power take-off casing 45 is formed into a shape in conformity with the shape of the upper end of the brake cover 7, and the power take-off casing 45 approaches the brake cover 7 with little interval therebetween, thereby securing compactness in the vertical direction of the axle driving apparatus.

The power take-off casing 45 can be detached from the housing 1 while a counter shaft 47 and the power take-off shaft 50 are pivotally supported. As shown in the embodiment of FIG. 3, a cover 74 in place of the power take-off casing 45 is attached to the outside surface of the housing 1, thereby covering the outer end of the speed-change shaft 14 projecting outward of the housing 1.

Figure 10:
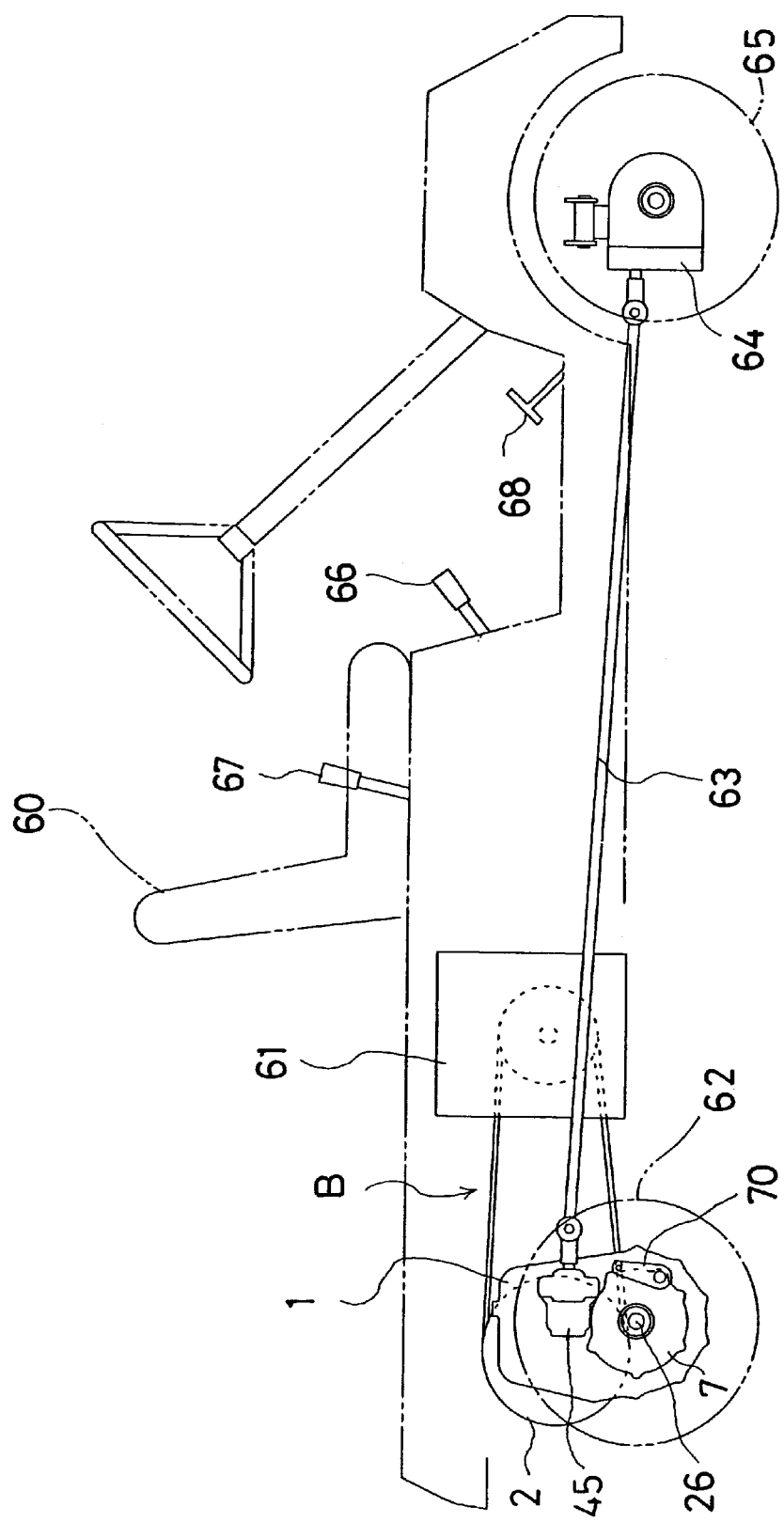
FIG. 10 is a side view showing a vehicle in which the axle driving apparatus according to this invention is used.

Next, a description will be given of a preferred embodiment in which the axle driving apparatus according to this invention as described above is applied to a vehicle of a four wheel drive type, with reference to FIG. 10. Vehicles of a four wheel drive type to which this invention can be applicable include a carrier and the like. The vehicle illustrated in FIG. 10 is a four wheel drive type, with right and left rear wheels 62 provided at the rear portion thereof and with right and left front wheels 65 at the front portion thereof, wherein power can be transmitted to all four wheels.

A driver's seat 60 is disposed in the vehicle. An acceleration pedal 68 is disposed near the lower front portion of the driver's seat 60; the differential lock lever 66 operatively interlocked with the differential lock slider 82 is disposed, immediately under the front end of the driver's seat 60. An auxiliary speed-change lever 67 operatively-interlocked with the operating shaft 35 is disposed to the side of the driver's seat 60.

An engine 61 is mounted below the lower rear portion of the driver's seat 60. The axle driving apparatus serving as a gear type transmission accommodated inside the housing 1 is arranged between the right and left rear wheels 62 rearward of the engine 61. The pair of axles 26 supported by the housing 1 are disposed on the right and left to be used as the axles for the rear wheels 62, which are secured to the tips of the axles 26, respectively.

The input shaft 3 projects on one side (at the left in this embodiment) of the housing 1. A belt converter B is interposed between the input pulley 2 fixed to the outer end of the input shaft 3, and the engine 61 as shown in FIG. 10. The belt converter B is constituted in such a manner as to be automatically shifted continuously onto a speed increasing side as the engine speed increases.

The power take-off casing 45 is disposed on a side opposite to the input shaft 3 in the housing 1 (i.e., at the right in this embodiment). The power take-off shaft 50 projects forward, to be used as a power take-off shaft for a vehicle of a front wheel drive type. Meanwhile, a front axle case 64 for pivotally supporting both the axles of the right and left front wheels 65 is disposed at the front portion of the vehicle. Power is transmitted from the power take-off shaft 50 into the front axle case 64 via a speed-change shaft 63, thereby driving the right and left front wheels 65.

The power is transmitted to the power taking-out shaft 50 via the speed-change shaft 14 inside the housing 1, as described above. Since the speed-change shaft 14 is rotated in synchronism with the axles 26, the power take-off shaft 50 also is rotated in synchronism with the axles 26 accordingly. Consequently, the rear wheels 62 and the front wheels 65 are rotated in synchronism with each other. Since the speed-change shaft 14 is located nearer to the front stage than the axles 26 in the transmission system inside the housing 1, small transmission torque to the front wheels 65 is sufficient. Therefore, even the compact arrangement can cope with the front wheel drive system located between the inside of the power take-off casing 45 and the inside of the front axle case 64, thus contributing to cost reduction. The speed-change shaft 14 is located above the axles 26, 26 and the brakes 6, 6 around the axles 26, 26, and the power take-off casing 45 is disposed sideways of the housing 1 by utilizing a space on a side opposite to the input shaft 3. Consequently, the provision of the power take-off casing 45 does not reduce the minimum road clearance.

In the case where the vehicle illustrated in FIG. 10 is used as a two wheel drive type without any power transmission to the front wheels 65, the cover 74 for covering the speed-change shaft 14 is attached to the right surface of the housing 1 in place of the power take-off casing 45, as described above.

Figure 11:
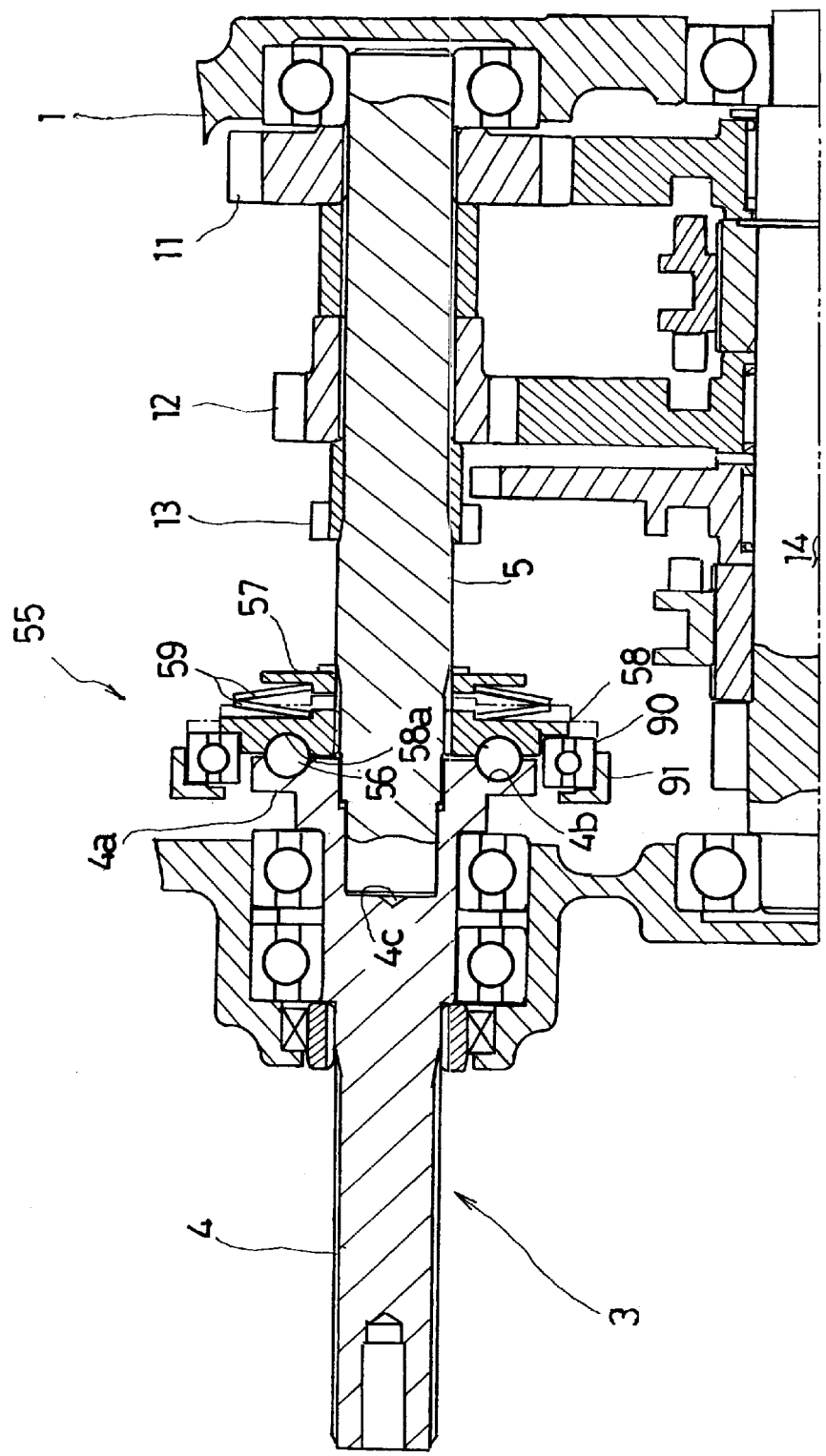
FIG. 11 is an enlarged rear cross-sectional view showing a torque detection type coupling disposed on an input shaft.
Figure 12:
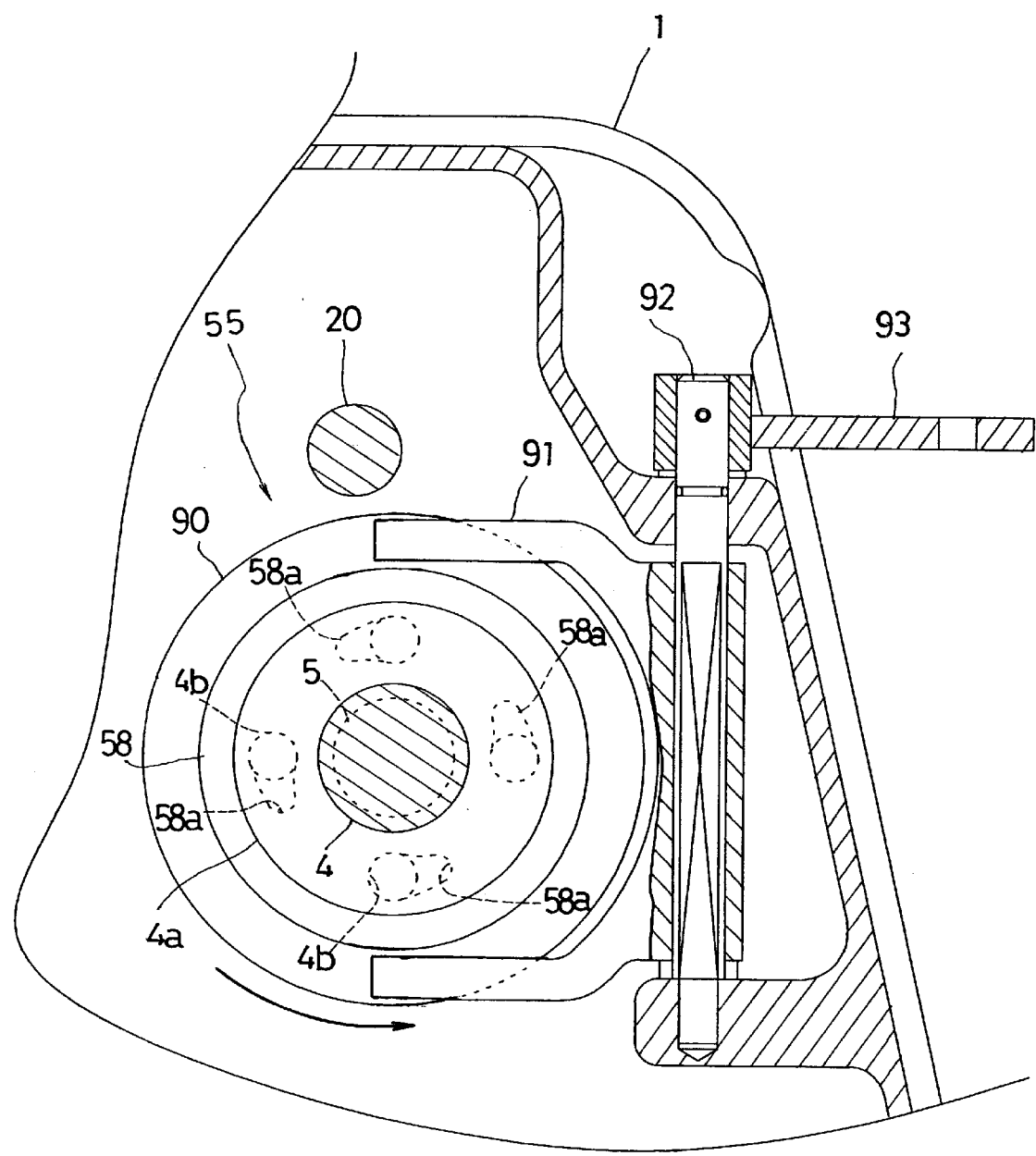
FIG. 12 is an enlarged side cross-sectional view showing the torque detection type coupling disposed on the input shaft of FIG. 11.
Figure 13:
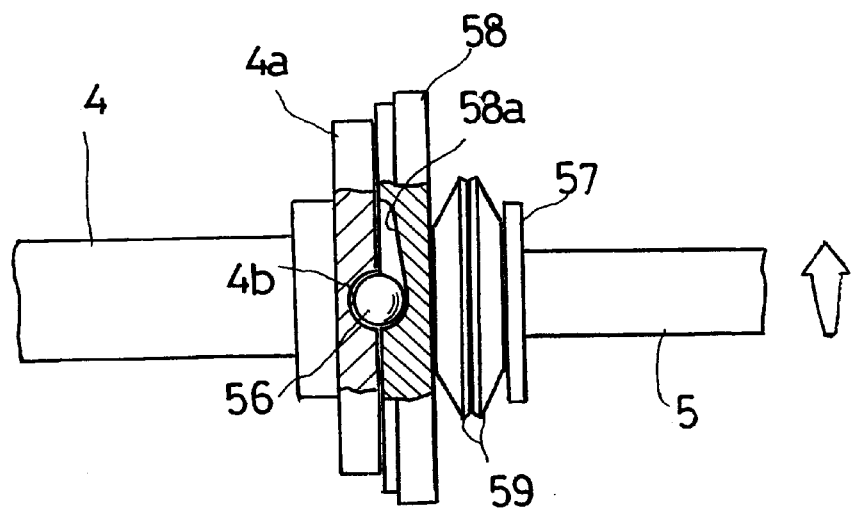
FIG. 13 is a side view, partly in section, showing a traveling wheel of a torque type coupling, to which little or no load is applied.
Figure 14:
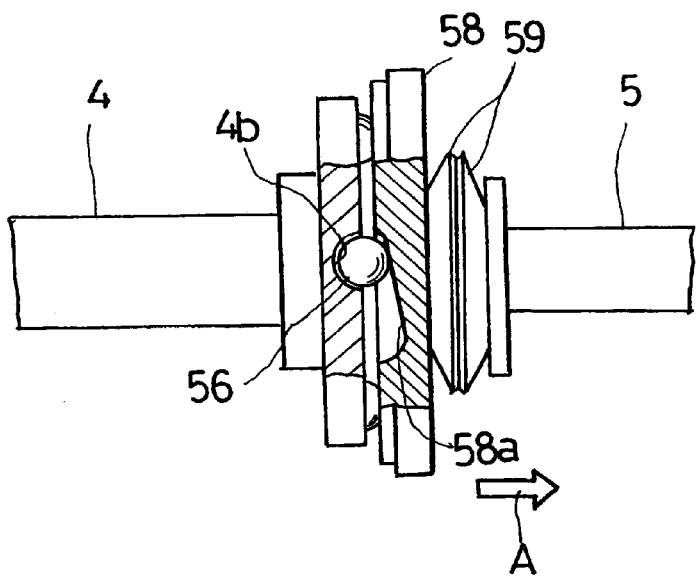
FIG. 14 is a side view, partly in section, showing the traveling wheel of FIG. 13 to which a heavy load is applied.

Finally, explanation will be made on the coupling 55 including a torque responsive device disposed on the input shaft 3 inside the housing 1 with reference to FIGS. 11 to 14. For convenience, the right and left positional relationships shown in FIGS. 11, 13 and 14 are used as the reference. The recess 4c is formed from the right end of the first input shaft 4 in the axial direction. The left end of the second input shaft 5 is rotatably inserted into the recess 4c. The second input shaft 5 is supported coaxially with the first input shaft 4 in such a manner as to be freely turned relative to each other.

A stationary portion 4a formed into a flange is formed at the right end of the first input shaft 4. A plurality of semispherical recesses 4b are formed equidistantly on the same circumference at the left surface of the stationary portion 4a, as viewed in the axial direction of the first input shaft 4.

On the other hand, a stopper plate 57 is fixingly disposed midway at the left of the second input shaft 5. A slider 58 formed into a disc is spline-engaged on the second input shaft 5 at the left of the stopper plate 57 in such a manner to be slidable in the axial direction and not relatively rotatably to each other. Cored disc springs 59,59 serving as resilient urging members are interposed between the slider 58 and the stopper plate 57, thereby urging the slider 58 leftward, i.e., toward the stationary portion 4a.

A plurality of cam grooves 58a are formed at the left surface of the slider 58 in such a manner as to correspond to the recesses 46 of the stationary portion 4a. As shown in FIG. 12, the cam grooves 58a are formed in a substantially arcuate manner on the axis of the second input shaft 5, and a delay side end in the rotating direction is formed into a semispherical shape in conformity with the recess 4b while being gradually narrowed and made shallower forward in the rotating direction, as shown in FIGS. 13 and 14.

A steel ball 56 serving as a cam is arranged between each of the cam grooves 58a and each of the recesses 4b. In the state in which the slider 58 is urged leftward by the urging force of the cored disc springs 59, 59, the steel ball 56 is completely embedded into the deepest portion (the semi-spherical portion)of the cam groove 58a and the recess 4b, so that the slider 58 approaches the stationary portion 4a. In this way, since the steel ball 56 is held between the cam groove 58a and the recess 4b, the first input shaft 4 and the second input shaft 5 engage with each other in an integrated fashion. The steel ball 56 may be replaced with a projecting member fixed to the stationary portion 4a.

The inner race of a release bearing 90 is immovably fixed at the outer end of the slider 58, whereby the entire release bearing 90 can be moved in the axial direction integrally with the slider 58. Furthermore, the free end of a fork 91 formed into a bifurcated shape, as in FIG. 12, engages with the left surface of the outer race of the release bearing 90. The boss of the fork 91 is fixed to a vertical coupling control shaft 92 rotatably supported by the housing 1. The upper portion of the coupling control shaft 92 projects outside of the housing 1, and further, a coupling control arm 93 is fixed at the upper coupling control shaft 92. One end of interlock means consisting of a wire or a link, is connected to the coupling control arm 93. The other end of the interlock means is connected to thrust adjusting means, i.e., a throttle lever, for the engine 61.

In this arrangement, the driving torque from the engine is transmitted to the second input shaft 5 through the coupling 55 including a torque responsive device between the stationary portion 4a of the first input shaft 4 and the slider 58 of the second input shaft 5. According to the increase or decrease of the transmitted torque by change of the load on the running wheels, an axial thrust force is generated in the cam portion, which makes the slider 58 slide against the biasing force of the disc springs 59, thereby adjusting the throttle lever in accordance with the movement quality of the slider 58.

In the case where the running vehicle runs on flat ground or the like, the running wheels never receive a great load. As shown in FIG. 13, the steel ball 56 is completely embedded into the deep portion of the cam groove 58a and the recess 4b, so that the fork 91 cannot be turned.

When the vehicle reaches an upslope, a mud road or the like, to exert a load on the running wheels, the transmitted torque is increased so as to increase the axial thrust force in the cam portion. According to the increase of the thrust force, the steel balls 56 push the slider 58 through the cam grooves 58a so as to make it slide along the second input shaft 5. When the thrust force becomes equal to the biasing force of the plate springs 59, the slider 58 stops sliding. Hence, the movement quality of the slider 58 is determined according to the load.

Consequently, as shown in FIG. 14, the slider 58 and the release bearing 90 are moved rightward (in a direction indicated by an arrow A). The fork 91 is turned on the coupling control shaft 92. The coupling control arm 93 is turned in interlock with the turning motion of the fork 91, so that the throttle lever for the engine is changed to increase the engine speed according to the load via the interlock means.

In this way, if the load is exerted on the running wheels under the above-described condition, the coupling 55 is operated to change fuel injection quantity adjusting means, thereby automatically adjusting the engine speed according to the load. In this manner, since the speed is adjusted not by the detection of the engine speed but by the detection of the load, reaction becomes quick, the degree of speed reduction on a downward slope or the like becomes small, a change in speed during work becomes small, and no engine stop occurs while running at a low speed.

A movement quantity of the slider 58 may be detected by a sensor connected to a controller, which may be connected to an actuator for changing the throttle valve so as to electrically actuate the actuator according to the load torque, thereby adjusting the thrust force. Although in the present embodiment, the coupling 55 is disposed on the input shaft 3, it may be disposed anywhere midway of the power transmission path between the engine 61 and the differential arrangement, and may be disposed on the speed-change shaft 14.

In this embodiment, the coupling 55 is disposed on the input shaft 3, however, it can be disposed on any rotary shaft, for example, the speed-change shaft 14, on the way of the power transmission course between the engine and the differential arrangement. Moreover, as the above mentioned, the only requirement for the power taking-out shaft 50 is to be substantially in synchronism with the axles 26 with a certain speed ratio thereto. If a rotary shaft, which is substantially in synchronism with the axles 26, is interposed between the speed-change shaft 14 and the axles 26, the rotary shaft, instead of the speed change shaft 14, may be extended outward from the housing and drivingly connected with the power taking-out shaft 50.

Figure 15:
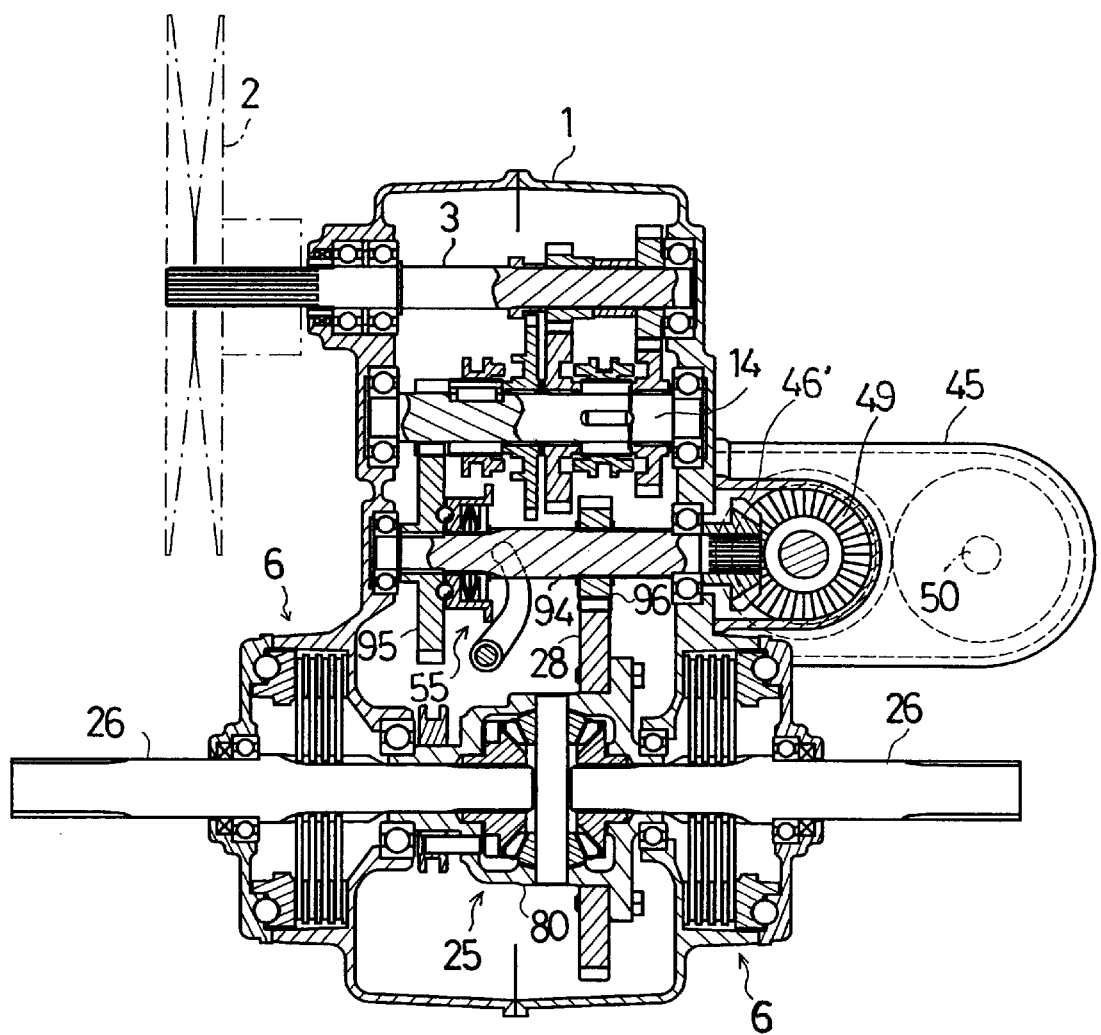
FIG. 15 is a rear cross-sectional view showing an axle driving apparatus according to another embodiment of this invention.
Figure 16:
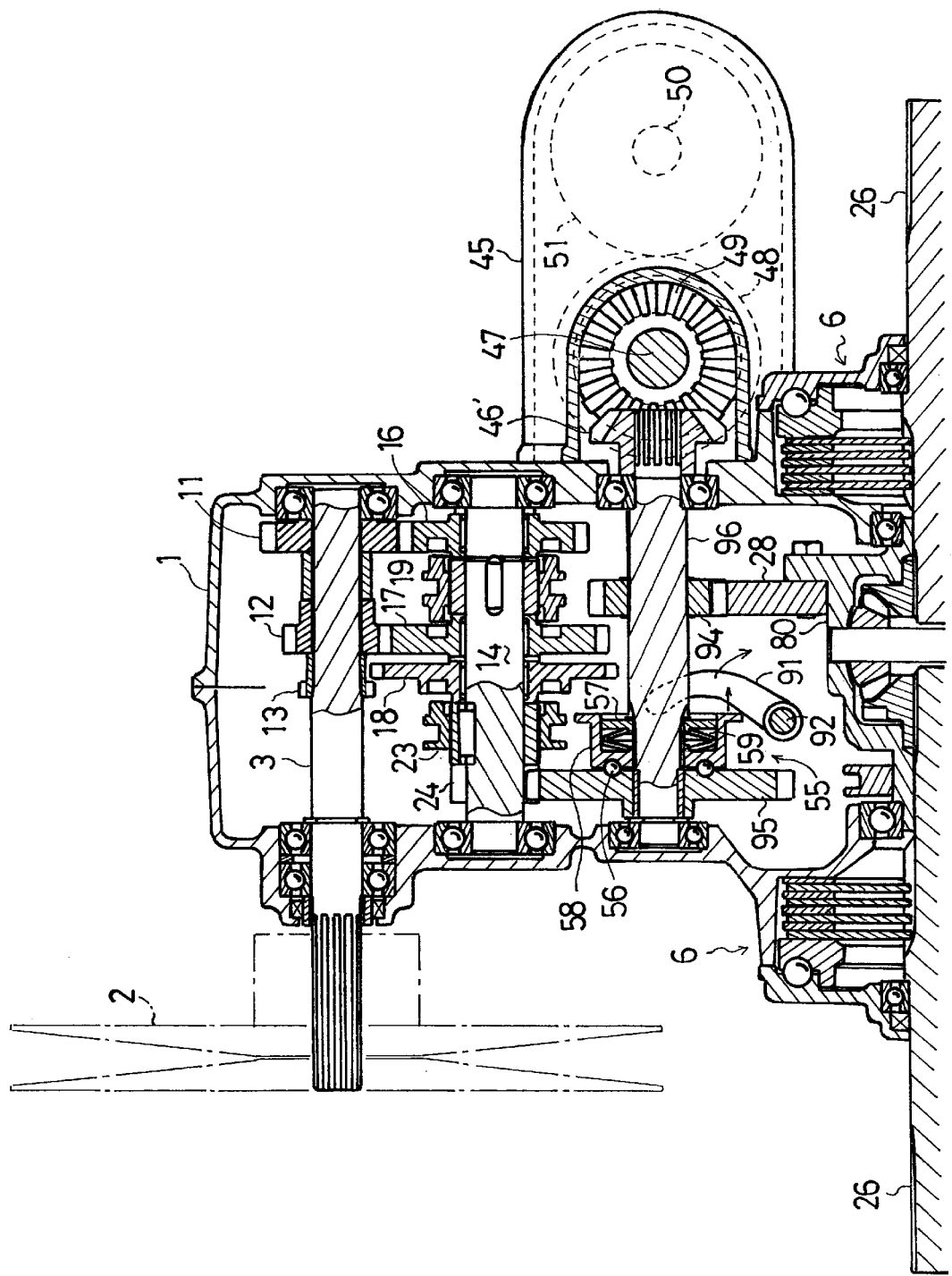
FIG. 16 is a rear cross-sectional view showing a part of the axle driving apparatus according to this invention.

In this regard, another embodiment of an axle driving apparatus shown in FIGS. 15 and 16 will be explained. Elements which are identical or similarly functional to those of the foregoing embodiment are marked by the same reference numerals. The idle shaft 20 and the shifter shaft 30 are omitted.

The input shaft 3 provided at its outer end with the input pulley 2 consists of a single shaft without being divided. A low speed gear train (gears 12 and 17) and a high speed gear train (gears 11 and 16) are interposed between the input shaft 3 and the speed-change shaft 14, similarly with the foregoing embodiment. Also, between the same shafts through the idle shaft 20 (not shown in FIGS. 15 and 16) is a reversing gear train. (The gear 13 on the input shaft 3 engages with the idle gear 21 on the idle shaft 20, and the idle gear 20 engages with the gear 18 on the on the speed-change shaft 14.)

In the present embodiment, a speed-reduction shaft 94 in parallel to the speed-change shaft 14 is laid between the speed-change shaft 14 and the differential arrangement 25 in the housing 1, and one end of the speed-reduction shaft 94 is projected outward from the housing on the opposite side of the input pulley 2. A bevel gear 46' is fixed on the outer projecting end of the speed-reduction shaft 94 and engages with the bevel gear 47 in the power take-off casing 45 fixed onto the outer surface of the housing 1. The speed-reduction shaft 94 is disposed above the axles 26, and the power taking-out casing 45 is disposed as not to interfere with the housing portion (the brake housing 7) for the braking mechanism 6.

In the housing 1, on the speed-reduction shaft 94 is freely provided a large diametric gear 95, and fixedly provided a small diametric gear 96. The large gear 95 engages with the gear 24 on the speed-change shaft 14, and the small gear 96 engages with the ring gear 28 on the differential casing 80.

The torque detecting type coupling 55 is disposed on the speed-reduction shaft 94. In this regard, onto the speed-reduction shaft 94 is fixed the stopper plate 57 and spline-fitted the slider 58 so as to enclose the stopper plate 57, so that the slider 58 is axially slidable and not relatively rotatable with respect to the speed-reduction shaft 94. The plate springs 59 are interposed between the slider 58 and the stopper plate 57 within the slider 58. Steel balls 56 as cams are interposed between the slider 58 and the large diametric gear 91. Similarly with the aforesaid coupling 55 provided between the input shafts 4 and 5, when some load is applied on driving wheels or axles 26, the slider 58 of the present coupling 55 slides on the speed-reduction shaft 94 like the arrow shown in FIG. 16 with as much degree as the axial thrust force caused by the load, so as to interlock the release lever 91 with the throttle lever for the engine 61. The coupling control lever 92 for the present invention is horizontally supported in relation to the arrangement of the coupling 55 and the surrounding space for it.

What is claimed is:

1. An axle driving apparatus comprising:

a housing;

a substantially horizontal input shaft which is pivotally supported inside said housing, projects outward on one side of said housing, and receives power from a motor via a belt converter;

axles pivotally supported in parallel to said input shaft inside said housing;

a speed-change mechanism interposed between said input shaft and said axles inside said housing;

at least one rotary shaft which is included in said speed-change mechanism, is rotated substantially in synchronism with said axles with a certain speed ratio thereto, is disposed above said axles with respect to the ground, and an outer end projects outward on one side of said housing;

a power take-off casing disposed outside of said housing and housing therein the outer end of said rotary shaft; and a power take-off shaft pivotally supported substantially horizontally in a direction perpendicular to said axles and operatively interlocked with said rotary shaft inside said power take-off casing.

2. An axle driving apparatus according to claim 1, wherein said rotary shaft and said power take-off shaft are operatively interlocked with each other via a pair of bevel gears in mesh with each other inside said power take-off casing.

3. An axle driving apparatus according to claim 2, wherein a counter shaft is supported in parallel to said power take-off shaft and wherein said counter shaft is nearer to said housing than is said power take-off shaft inside power take-off casing, and said pair of bevel gears in mesh with each other are interposed between said rotary shaft and said counter shaft, and a pair of gears in mesh with each other are interposed between said counter shaft and said power take-off shaft.

4. An axle driving apparatus comprising:

a housing;

a substantially horizontal input shaft which is pivotally supported inside said housing, projects outward on one side of said housing, and receives power from a motor via a belt converter;

axles pivotally supported in parallel to said input shaft inside said housing;

a speed-change mechanism interposed between said input shaft and said axles inside said housing;

at least one rotary shaft which is included in said speed-change mechanism, is rotated substantially in synchronism with said axles with a certain speed ratio thereto, is disposed above said axles with respect to the ground, and an outer end projects outward of said housing on a side opposite to a side where said input shaft projects out of said housing;

a power take-off casing disposed outside of said housing and housing therein the outer end of said rotary shaft; and a power take-off shaft pivotally supported substantially horizontally in a direction perpendicular to said axles and operatively interlocked with said rotary shaft inside said power take-off casing.

5. An axle driving apparatus comprising:

a housing;

a substantially horizontal input shaft which is pivotally supported inside said housing, projects outward on one side of said housing, and receives power from a motor via a belt converter;

axles pivotally supported in parallel to said input shaft inside said housing;

brake devices disposed on said axles on at least one side of said housing;

a speed-change mechanism interposed between said input shaft and said axles inside said housing;

at least one rotary shaft which is included in said speed-change mechanism, is rotated substantially in synchronism with said axles with a certain speed ratio thereto, is disposed above said axles with respect to the ground, and an outer end projects outward of said housing on one side of said housing;

a power take-off casing disposed outside of said housing and housing therein the outer end of said rotary shaft; and a power take-off shaft pivotally supported substantially horizontally in a direction perpendicular to said axles inside said power take-off casing and operatively interlocked with said rotary shaft.

* * * * *